(12) United States Patent
Martovitz et al.

(10) Patent No.: US 8,123,625 B2
(45) Date of Patent: Feb. 28, 2012

(54) APPARATUS FOR ANALYZING A SWING OF A SPORTING EQUIPMENT

(76) Inventors: Thomas J. Martovitz, Brunswick, OH (US); Barbara A. Martovitz, Brunswick, OH (US)

( * ) Notice: Subject to any disclaimer, the term of this patent is extended or adjusted under 35 U.S.C. 154(b) by 32 days.

(21) Appl. No.: 12/755,411

(22) Filed: Apr. 6, 2010

(65) Prior Publication Data

US 2011/0244976 A1    Oct. 6, 2011

(51) Int. Cl.
*A63B 69/36* (2006.01)
*A63B 57/00* (2006.01)

(52) U.S. Cl. ........ 473/228; 473/234; 473/285; 473/286; 473/408

(58) Field of Classification Search .................. 473/228, 473/234, 285, 286, 408; 446/216, 204–206; 116/137 R; 434/252
See application file for complete search history.

(56) References Cited

U.S. PATENT DOCUMENTS

| | | | | |
|---|---|---|---|---|
| 1,748,460 A | * | 2/1930 | Petrie | 446/205 |
| 3,730,530 A | * | 5/1973 | Oka et al. | 473/234 |
| 3,776,556 A | * | 12/1973 | McLaughlin | 473/234 |
| 4,094,504 A | * | 6/1978 | Barasch | 473/461 |
| 4,283,057 A | * | 8/1981 | Ragan | 473/234 |
| 4,377,125 A | * | 3/1983 | Westfall | 116/67 R |
| 5,002,006 A | * | 3/1991 | Ehrenreich | 116/137 R |
| 5,769,740 A | * | 6/1998 | Colangelo | 473/408 |
| 6,033,322 A | * | 3/2000 | England | 473/408 |
| 2004/0142773 A1 | * | 7/2004 | Kennedy | 473/408 |
| 2009/0105004 A1 | * | 4/2009 | Cheresko | 473/234 |

* cited by examiner

*Primary Examiner* — Sebastiano Passaniti

(57) ABSTRACT

An apparatus for sporting equipment includes a housing. An inlet orifice is disposed on a first side of the housing for enabling a volume of air to enter the housing in response to the housing being passed through the air generally about a plane defining a swing. An exhaust orifice disposed on a second side of the housing for enabling the volume of air to exit the housing to produce a sound indicative of a path of the housing about the plane. Means joins the housing to the sporting equipment.

8 Claims, 2 Drawing Sheets

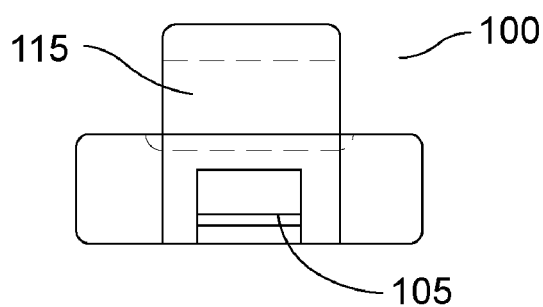
Figure 1A
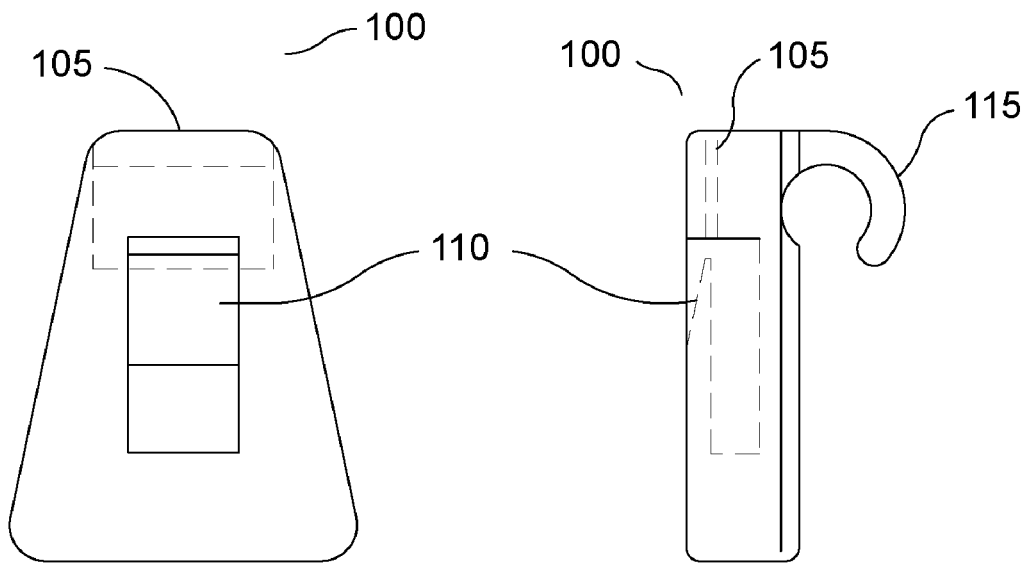
Figure 1B
Figure 1C

APPARATUS FOR ANALYZING A SWING OF A SPORTING EQUIPMENT

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to sports equipment. More particularly, the invention relates to a device that enables a user to analyze his swing while swinging various types of sports equipment.

BACKGROUND OF THE INVENTION

The present invention aids in analyzing, diagnosing and practicing swing fundamentals when swinging sports equipment for various sports such as, but not limited to, golf, tennis, baseball, etc. These sports and many others require a user to swing a piece of equipment to hit an object such as, but not limited to, a ball, puck or shuttlecock. Swing mechanics involve a complex combination of movements on the part of the athlete, and finding a correct swing, that results in consistently good performance, can be difficult for the athlete. Prior art solutions are often difficult to set up, technically complex and costly. An object of the present invention is to provide an affordable, simple to make, easy to attach and provide room for an advertizing logo. Another object of the present invention is to provide ease in training and understanding the swing.

In view of the foregoing, there is a need for improved techniques for aiding a user in easily finding a swing for a particular piece of sporting equipment that consistently provides good results for the user.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A through 1C illustrate an exemplary swing plane indicator, in accordance with an embodiment of the present invention. FIG. 1A is a diagrammatic top view. FIG. 1B is a diagrammatic front view, and FIG. 1C is a diagrammatic side view.

Figure 2:
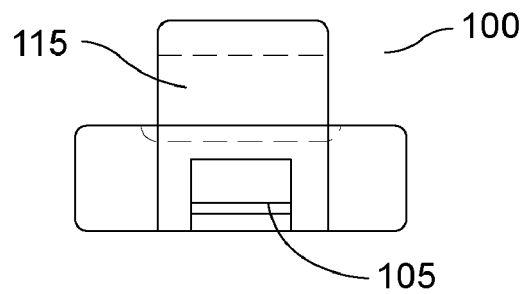
FIG. 2 illustrates an exemplary swing plane indicator including a divot repair tool and ball marker holder, in accordance with an embodiment of the present invention.
Figure 2:
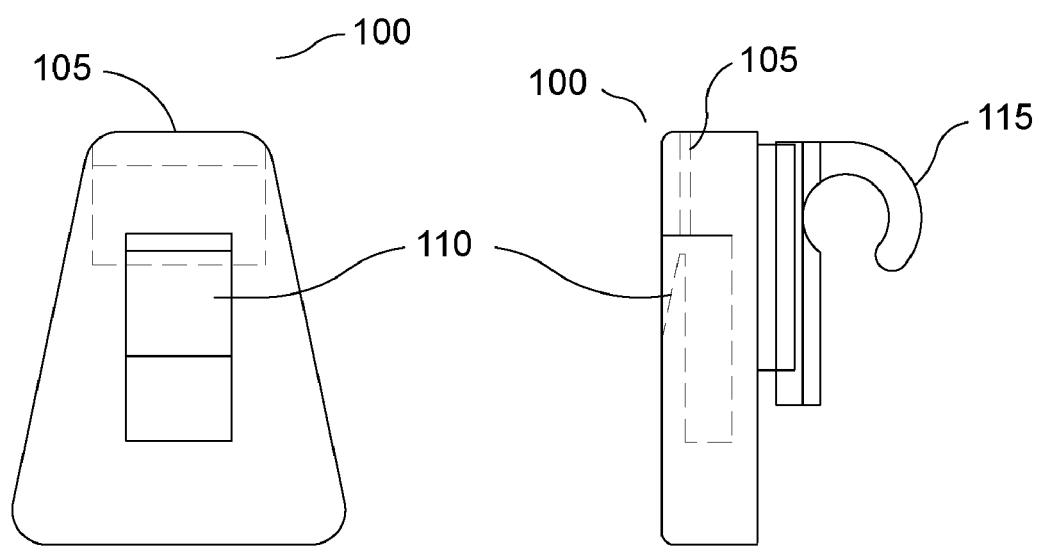
Figure 2:
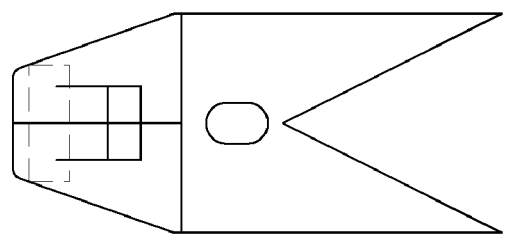

Unless otherwise indicated illustrations in the figures are not necessarily drawn to scale.

SUMMARY OF THE INVENTION

To achieve the forgoing and other objects and in accordance with the purpose of the invention, an apparatus for analyzing a swing of a sporting equipment is presented.

In one embodiment an apparatus for a sporting equipment includes a housing, means for enabling a volume of air to enter the housing in response to the housing being passed through the air generally about a plane defining a swing, means for enabling the volume of air to exit the housing to produce a sound indicative of a path of the housing about the plane, and means for joining the housing to the sporting equipment.

In another embodiment an apparatus for a sporting equipment includes a housing. An inlet orifice is disposed on a first side of the housing for enabling a volume of air to enter the housing in response to the housing being passed through the air generally about a plane defining a swing. An exhaust orifice disposed on a second side of the housing for enabling the volume of air to exit the housing to produce a sound indicative of a path of the housing about the plane. Means joins the housing to the sporting equipment. In alternate embodiments, the apparatus can be made into any suitable shape, including, but not limited to trapezoidal, round, and square shapes. It is contemplated that it can even be made to represent a figurine, a super hero and\or any practical shape or form.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Preferred embodiments of the present invention aid in analyzing, diagnosing and practicing swing fundamentals for sports equipment used in various sports such as, but not limited to, golf, tennis, baseball, etc. In golf, a swing plane is defined as the imaginary plane in which the head of the golf club travels during the swing or the angle at which the shaft of the club travels around the body of the golfer. The swinging motions of other types of sports equipment, such as, but not limited to, baseball bats and tennis rackets, may similarly be tracked along a swing plane. Preferred embodiments provide a device that enables a user to hear this swing plane. The mechanics of individual's swings are different, specifically in reference to the stance and the positioning of the hips, head, legs, and hands. Therefore, preferred embodiments of the present invention enable a user to practice his individual swing mechanics while concentrating on the sound of the swing to practice hearing and hitting the same spot over and over to generally improve his rhythm and tempo to become better physically and mentally at the particular game he is playing.

FIGS. 1A through 1C illustrate an exemplary swing plane indicator 100, in accordance with an embodiment of the present invention. FIG. 1A is a diagrammatic top view. FIG. 1B is a diagrammatic front view, and FIG. 1C is a diagrammatic side view. In the present embodiment, swing plane indicator 100 is a simple mechanical device that, once put on a golf club or other type of sports equipment, makes a sound when the equipment is swung. This sound may be a noise similar to a whisper or a whistle. Swing plane indicator 100 comprises an inlet orifice 105 and an exhaust orifice 110 to create these sounds. In the present embodiment, swing plane indicator 100 also comprises a mechanical clip 115 that enables it to be clipped onto various different golf clubs. However, alternate embodiments may comprise various different types of attachment means such as, but not limited to, clips for other types of sporting equipment, hooks, tape, hook and loop material, screws, means for sliding the device onto the equipment, etc.

In alternative embodiments of the present invention, the swing plane indicator includes a divot repair tool and ball marker holder. In the preferred version, a rotating mechanism may be included, which can be implemented as a simple screw or rotating mechanism to teach the proper downward or upward incline/plane of the swing. Once the user is attached to the club, with a added screw or rotating mechanism the user can now hear the swing plane for a sharper and/or flatter swing plane, this represents hitting a low flat ball or a high flying ball. In this way, the rotating mechanism enables swing plane indicator to rotate about mechanical clip and be secured at any angle relative to the golf club. In other alternate embodiments, the device may be built into the equipment. In the present embodiment, swing plane indicator 100 is preferably made of plastic; however, other construction materials may be used such as, but not limited to, metal or wood.

In typical use of the present embodiment, swing plane indicator 100 is placed on a golf club; however, alternate embodiments may be implemented to be placed on other types of sports equipment such as, but not limited to, baseball bats, tennis rackets, fishing rods, etc. Other alternate embodiments may be implemented to be placed on various body parts of the user, for example, without limitation, the arm to track a throw or the leg to track a kick. In the present embodiment once swing plane indicator 100 is on the golf club, a user practices his swing. The swinging motion of the golf club forces air into inlet orifice 105 and out outlet orifice 110, creating a sound. This sound from swing plane indicator 100 enables a user to not only feel and see his swing, but also to hear the swing. This enables the user to create a clearer picture of his swinging path using his muscle memory and hearing memory to create a mental picture of his swing in his mind's eye. In this fashion the user can practice and analyze his swing. In the present embodiment, swing plane indicator 100 may aid the user in improving his practice by maintaining his awareness of his swinging path.

Swing plane indicator 100 also maintains the user's awareness of the speed of his swing since the volume and pitch of the sound created by swing plane indicator 100 changes with the speed of the swing. Generally, the faster or harder the user swings, the louder and higher pitched the sound will be. Swing plane indicator 100 can also be made to make a louder sound, a monotone sound, or various sounds through the swing by adjusting the inlet and exhaust orifices. Using swing plane indicator 100, the user may practice his swing by listening to the sound and aiming at the same spot over and over. This practice aids the user in improving his sport by hearing his sweet spot and finding his swing. Techniques similar to this may be employed when using alternate embodiments of the present invention that are adapted to analyze the swings of other types of sports equipment. In some alternate embodiments, the present whistle device is configured according know known principles to make sounds at specific speeds for people who like to learn to swing fast and faster; by way of example, and not limitation, it could be designed to only make a particular sound at swings speed 60 mph, 70 mph, 100 mph etc.

In another exemplary application of the present embodiment, the user may use two swing plane indicators on a golf club. When using two swing plane indicators, they should preferably be different colors, for example, without limitation, one colored bright red and one colored bright yellow. The different colors enable a user to analyze his swing. In this example, the user aligns the red and yellow swing plane indicators perpendicularly to the face of his club with the red indicator on the right and the yellow indicator on the left when looking down at the clubface for a right handed user. For a left handed user, the order of the colors would be reversed. As the user swings, he may watch the colors of the indicators to determine if the face of his club is positioned correctly during his swing. If the red and yellow indicators are even (i.e., the same distance from the user) as the user listens and watches his swing, he is swinging square to his clubface. If the red indicator is ahead of the yellow indicator (i.e., the red indicator is further away from the user), the clubface is closed, which causes a draw or hook in the user's shot. If the yellow indicator is ahead of the red indicator (i.e., the yellow indicator is further away from the user), the clubface is opened, which causes a fade or slice in the user's shot. By watching the indicators while swinging, the user may determine if he is not swinging his clubface square and, if so, may attempt to correct this. Those skilled in the art, in light of the present teachings, will readily recognize that more swing plane indicators may be used in different applications and that multiple swing plane indicators may be used on sports equipment other than golf clubs.

Alternate embodiments of the present invention may comprise a sound or music box that can relay information to the user. For example, without limitation, for a good swing the attached sound box may exclaim "you got a hold of that one" or "nice swing". Other alternate embodiments may include electronics and lights for visibility and sound. Yet other alternate embodiments may be made in several parts and may show angles and degrees of swing path.

Having fully described at least one embodiment of the present invention, other equivalent or alternative methods of providing a swing plane indicator according to the present invention will be apparent to those skilled in the art. The invention has been described above by way of illustration, and the specific embodiments disclosed are not intended to limit the invention to the particular forms disclosed. For example, the particular implementation of the swing plane indicator may vary depending upon the particular type of object on which it is mounted. The swing plane indicators described in the foregoing were directed to implementations to be mounted on various types of sporting equipment; however, similar techniques are to track the swinging motions of other types of objects such as, but not limited to, tools, weapons, pieces of machinery, etc. Non-sporting implementations of the present invention are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. An apparatus for a sporting equipment, the apparatus consisting essential of:
   a housing comprising a first side comprising a flat surface forming a rectangle and a second side consisting essential of a flat surface forming an isosceles trapezoid oriented perpendicular to said first side with the shortest side of the isosceles trapezoid being equal in length to the longest side of the rectangle, the shortest side of the isosceles trapezoid being joined to the longest side of the rectangle, the housing further consisting essentially of additional sides to form a volume;
   a first singular means disposed on the first side for enabling a volume of air to enter the housing in response to the housing being passed through the air generally about a plane defining a swing;
   means for defining a plurality of passageways for the volume of air to flow, each of the passageways consisting essentially of a different length;
   a second singular means disposed on the second side for enabling the volume of air from the plurality of passageways to exit the housing to produce a continuous sound, during the passing through the air, in which a tone of the continuous sound is indicative of a path and a rate of travel of the housing about the plane; and
   means for joining the housing to the sporting equipment.

2. The apparatus as recited in claim 1, further comprising means for enabling rotation of the joining means with respect to the housing.

3. The apparatus as recited in claim 1, further comprising means for divot repair and for holding a ball marker.

4. An apparatus for a sporting equipment, the apparatus comprising:
   a housing comprising a first side comprising a flat surface forming a rectangle and a second side comprising a flat surface forming an isosceles trapezoid oriented perpendicular to said first side with the shortest side of the isosceles trapezoid being equal in length to the longest side of the rectangle, the shortest side of the isosceles trapezoid being joined to the longest side of the rectangle, the housing further comprising additional sides to form a volume;
   a singular inlet orifice disposed on the first side of the housing, the singular inlet comprising a rectangular slit parallel to the longest side of the rectangle, the singular inlet being operable for enabling a volume of air to enter the housing in response to the housing being passed through the air generally about a plane defining a swing;
   a plurality of flat structures being disposed within the housing for defining a plurality of passageways for the volume of air to flow, each of the passageway comprising a different length;
   a singular exhaust orifice disposed on the second side of the housing, the exhaust orifice comprising a rectangular opening with a side of the rectangular opening being parallel to the shortest side of the isosceles trapezoid, the exhaust orifice being operable for enabling the volume of air from the plurality of passageways to exit the housing to produce a continuous sound, during the passing through the air, in which a tone of the continuous sound is indicative of a path and a rate of travel of the housing about the plane; and
   means for joining the housing to the sporting equipment.

5. The apparatus as recited in claim 4, further comprising means for enabling rotation of the joining means with respect to the housing.

6. The apparatus as recited in claim 4, wherein the sporting equipment is a golf club.

7. The apparatus as recited in claim 6, further comprising means for divot repair and for holding a ball marker.

8. The apparatus as recited in claim 4, wherein the apparatus is molded from plastic.

* * * * *